United States Patent [19]
Colussi et al.

[11] Patent Number: 5,591,243
[45] Date of Patent: Jan. 7, 1997

[54] LIQUID TRAP FOR COMPRESSED AIR

[75] Inventors: Rafael A. Colussi; Nestor J. Venica, both of Provincia de Santa Fe, Argentina

[73] Assignee: Col-Ven S.A., Provincia de Santa Fe, Argentina

[21] Appl. No.: 304,761

[22] Filed: Sep. 12, 1994

[30] Foreign Application Priority Data

Sep. 10, 1993 [AR] Argentina ........................ 325986

[51] Int. Cl.⁶ .................... B01D 45/08; B01D 50/00
[52] U.S. Cl. .................... 55/321; 55/327; 55/331; 55/336; 55/463; 55/DIG. 17; 95/268
[58] Field of Search ............... 55/463, DIG. 17, 55/331, 327, 325, 337, 321, 456, 447, 448, 461, 320, 326, 330, 333, 336; 95/268, 272

[56] References Cited

U.S. PATENT DOCUMENTS

| | | | |
|---|---|---|---|
| 1,519,541 | 12/1924 | Johnson | 55/456 |
| 1,774,295 | 8/1930 | Smallhouse | 55/456 |
| 2,127,746 | 8/1938 | Logan | 55/DIG. 17 |
| 2,188,993 | 2/1940 | Ziegler | 55/463 |
| 2,487,115 | 11/1949 | Dyke | 55/325 |
| 2,894,600 | 7/1959 | Veres | 55/DIG. 17 |
| 2,942,691 | 6/1960 | Dillon | 55/DIG. 17 |
| 2,970,669 | 2/1961 | Bergson | 55/456 |
| 3,093,467 | 6/1963 | McLaughlin | 55/DIG. 17 |
| 3,104,963 | 9/1963 | Bonnett | 55/463 |
| 3,732,075 | 5/1973 | Acaba | 55/321 |

FOREIGN PATENT DOCUMENTS 982739  12/1982  U.S.S.R. ............... 55/DIG. 17

*Primary Examiner*—Jay H. Woo
*Assistant Examiner*—Duane S. Smith
*Attorney, Agent, or Firm*—Lowe, Price, LeBlanc & Becker

[57] ABSTRACT

A device for separating liquid particles from compressed air transported therthrough, to protect machine parts connected thereto. The device is simple to manufacture, easy to maintain and can be made of low-cost materials such as injection molded plastics. A cylindrical housing has an inlet and an outlet at opposite ends thereof for coupling into the installation. A plurality of cones are formed into a vertical pile and closely spaced from one another. Each cone has a concave deflector surface opening out towards the inlet and an orifice cut out at one point on the edge of the cone. The cones are mounted inside the housing and their edges fit closely against the inner wall surface of the housing so that the orifices of consecutive cones are offset 180° apart. Fluid entering the inlet is subject to successive collisions agains the cone deflector surfaces, alternating a deflector surface with passage through the orifice of the associated cone, thereby being subjected to a generally helical path alternating 180° horizontal spans with shod vertical spans. The housing may also contain a filter for solid particles placed between the last cone and the outlet.

20 Claims, 1 Drawing Sheet

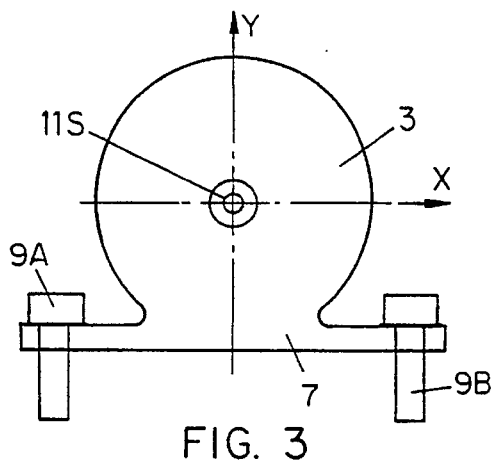
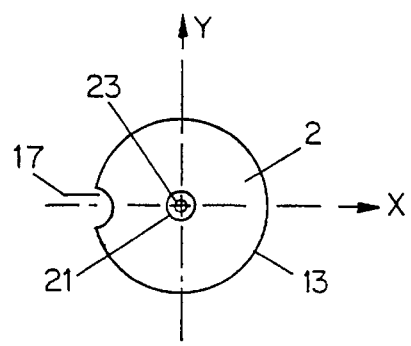
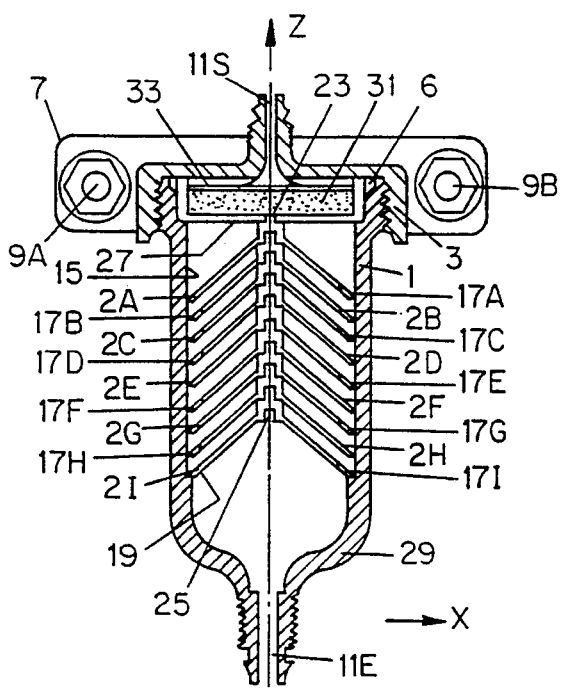
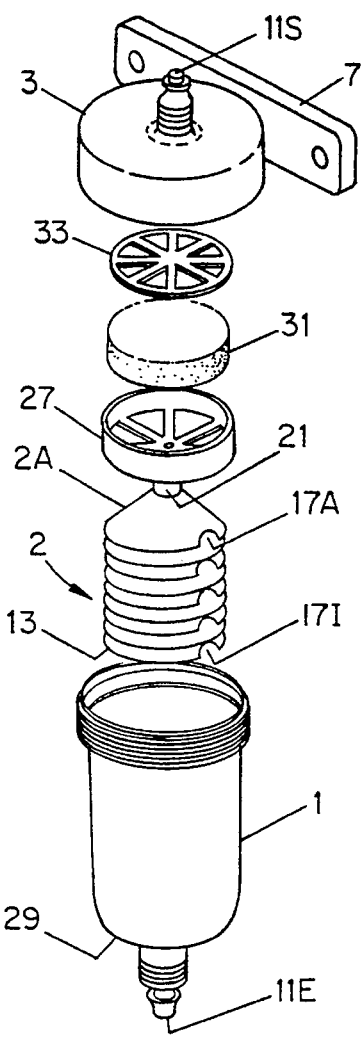
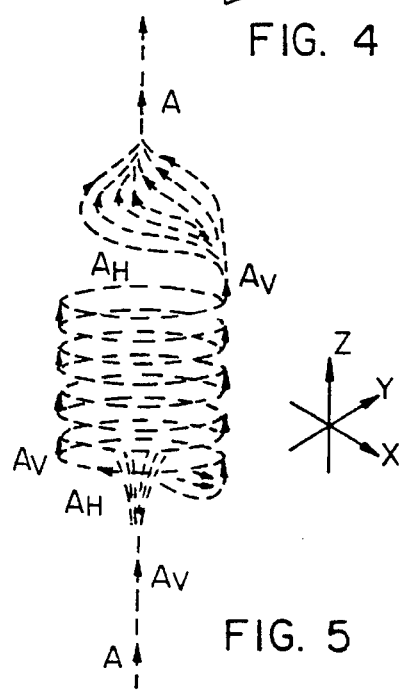

5,591,243

LIQUID TRAP FOR COMPRESSED AIR

FIELD OF THE INVENTION

The instant invention concerns a separator and filter device designed in principle for compressed air installations. In particular, it relates to a device for separating liquid particles from the compressed air stream and preferably further includes an accesory filter means for retaining solid particles. The device may be fitted in compressed-air piping for protecting machines and machine parts connected thereto.

BACKGROUND OF THE INVENTION

Piping installations transporting compressed air are widely used in industry, both for power transmission and signalling. Power supply systems transmitting via compressed air generally include a compressed air source, in the form of a compressor, connected through one or more pipes or air conducts to different machine parts such as valves and cylinders of machines and tools.

It is well known for compressed-air circuits to be subject to the presence of undesirable elements or particles which progressively deteriorate moving machine parts or parts coming into contact therewith. Such undesirable elements are, among others, water, oil, metallic and non-metallic particles, loose rust remains, etc., all of which may adversely affect the efficiency of the system apart from reducing the life-span of machine parts if left to accumulate and reach machinery supplied with the compressed air.

For instance, water in piping is the result of vapour condensate in the compressed air as a consequence of the compression and subsequent cooling of air in the compressor. Rust is a consequence of the water content. Oil droplets seep into the installation from the compressor itself just like small bits of metal which wear off from the machinery and non-metallic debris which comes away from filter materials, for instance.

This problem can be solved by conveniently installing liquid separators and solid filters at strategic points of the installation.

SUMMARY OF THE PRIOR ART

Those found on the market are good at preserving machines in the installation, altough they are rather expensive and require periodic servicing for cleaning and maintenance and replacing the filter material. This maintenance has a couple of drawbacks in that it requires skilled labour and takes up a certain amount of time during which the installation is out of service. In the end, the overall cost and time problems of not protecting the installation are really just mitigated but does not done away with it altogether by the prior art devices.

SUMMARY OF THE INVENTION

An object of the present invention is a low-cost and efficient device for this purpose.

Another object is a device which can be seviced in very little time and without having to resort to skilled technicians.

A particular object of the present invention is a device designed to separate the liquid phase from compressed air in piping on the basis of the different specific weight between them both and which, at the same time, can be produced with low cost materials and manufacturing techniques. A further object is to achieve a liquid-particles separator device enjoying these advantages and which may also incorporate therein an accesory for filtering out solid particles and waste.

The device of the present invention is a particle separator and filter essentially comprising means for separating liquid particles housed in a body having an inlet for coupling to the upstream side of a pipe carrying compressed air and an outlet for coupling to the downstream side of the pipe.

The principle under which the liquid particles separator of the invention operates is based on the difference in molecular weights between air and the above-mentioned undesirable particles, the invention making the stream of contaminated air collide against surfaces forming oblique angles with the normal pipe direction, forcing the air stream to change direction and reduce speed. By orienting the device so that the air enters upwards slows down the undesirable particles to be eliminated so that they ultimately fall down the conduit transporting them and be eliminated.

According to the invention, the separator means comprise a plurality of deflectors elements in a pile, that is aligned one on top of the other in the longitudinal direction determined by the general trajectory of the fluid entering via the body inlet, that is the direction of the pipe. This direction is preferably vertical with the inlet at the bottom and the outlet at the top. Each element has a concave deflector surface directed towards the upstream side and at an oblique angle to the longitudinal direction and an eccentric passage connecting the deflector surface to its opposite side downstream. Because of the oblique angle determined by the concavity of the deflector, the passage is located behind, in the longitudinal direction, all or nearly all of the deflector surface. The deflectors are placed so that the passages are not in line, in the sense that passages of consecutive deflectors zig-zag accross the longitudinal direction.

The inner wall of the body is made to fit closely against the edges of the deflector elements. This together with the passage disalignment and the inclination of the deflector surfaces causes the air stream to change direction continuously, sometimes more than 90°. Thus, zig-zag movements are combined with helicoidal trajectories, alternating vertical-to-approximately-horizontal direction changes of 130°, changing for instance from going 180° upwards to a downward 10° angle, with horizontal generally 180° turbulent rotations from one side of the body to the other (where the next passage is) as the air stream progresses in the overall vertical direction from down below, from the inlet, to up above, where the outlet is.

Each passage preferably comprises a peripherical orifice in the respective deflector element, against the wall of the body and in alternating azimuth positions such that consecutive deflector elements have their respective passages in diametrically opposite positions, thereby maximizing the helicoidal movement to which the fluid is subjected. In the preferred embodiment, the deflector elements comprise a cone each, open at their bases, parallel to each other and aligned with their apices pointing downstream (which is preferably upwards as specified already), the cones being longitudinally spaced at a distance smaller than the height of the cones so that they partly penetrate into one another, subjecting the fluid to changes of direction greater than 90°, preferably between 100° and 130°.

The device of the present invention may also comprise, by way of an accesory, a solid particle filter housed in the body, following the set of liquid separator elements and preceding the outlet. This filter may comprise a disk element or capsule affixed to the apex of the top deflector element of said plurality, said disk element containing an exchangeable element permeable to air but not to solid particles.

The body, the deflector elements and the rest of the parts in general, excepting the solids filter material which can be of low-cost foam material, are entirely made of injected plastics for low cost which is an object of the invention. To make maintenance easier, yet another stated object of the invention, the body includes a cap for mounting the device. The cap screws onto its top or down-stream end and is provided with the outlet integrated therewith. The inlet is conveniently aligned with the outlet, at the opposite end of the body which is closed, and integrated into the body material.

BRIEF DESCRIPTION OF THE DRAWINGS

The above-stated and other novel features and aspects of this invention and its reduction to practice may be understood better from the following detailed description of a preferred embodiment shown in the attached drawings, wherein:

FIG. 1 is a diagram of a longitudinal section of a device for separating and filtering liquid and solid particles in compressed air piping, built according to the present invention.

FIG. 2 is a plan view of any one of the deflectors of the device of FIG. 1.

FIG. 3 is a top view of the device of FIG. 1.

FIG. 4 is a perspective view of the device of FIG. 1 dismantled.

FIG. 5 is a pseudo-three-dimensional schematical representation of the compressed air trajectory through the device of the FIG. 1, to illustrate the operative principle of the present invention.

DETAILED DESCRIPTION OF A PREFERRED EMBODIMENT

The embodiment illustrating the present invention comprises a generally cylindrical hollow body I made of plastics from injection molding. The body 1 houses a plurality of deflector cones 2A, 2B, . . . 2l (generally identified with the reference 2) made using the same material and technique.

The cylindrical body 1 is fully open at the top where it has an external thread for screwing on a cap 3 of plastics also. An O-ring 6 seals the cap 3. A flat molding plate 7 is integrated during injection moulding with the cap 3 and at a tangent therewith. The plate 7 has a couple of orifices near its ends for bolts or screws 9A and 9B for mounting the separator and filter device of the invention so that its longitudinal axis Z is vertical, the body 1 hanging down from the cap 3.

An inlet 11E at the bottom of the body 1 has a thread for coupling on to the up-stream side of the piping of the compressed air installation to be protected, that is to the compressor (not illustrated) from where the air comes. In turn, the cap 3 is furnished with a concentric outlet orifice 11S, similar to the inlet orifice 11E, to enable connection to the down-stream side of the compressed air installation. Both orifices 11 (i.e. 11E–11S) are much smaller than the body section 1 and, moreover, aligned with each other along the central longitudinal axis Z formed by the generatrix of the body 1.

The deflector cones 2 open out downwards, towards the inlet 11E. They fit snugly inside the body 1 so that their edges 13 seal all around against the inner wall 16 of the body, except where a round orifice 17 is cut out, through which the passage of the air flow A is forced on its way upwards towards the outlet 11S. In effect, the flow of compressed air A coming from the compressor enters through the inlet 11E, and presumably contaminated by matter in the form of liquid and solid particles, like water from condensed vapour, drops of oil, metal cuttings, rust, etc., rises vertically in direction until it collides with the lower deflector 21. This first deflector 21 includes a deflector surface 19 which forces the air-flow A to switch direction. Even the vertical component of the air stream switches from straight upwards to slightly downwards, so that it progresses then towards the orifice 17l cut out in the edge of the deflector 21.

The passage-orifice 17H of the second cone 2H is offset 180° according to a horizontal plane relative to the first one 17l so that it is against the opposite side of the wall 16. In turn, the third orifice 17G is again offset 180° from the second one 17H, that is back to the same acimutal position as the first passage 17l, and so on in a way that the orifices of the odd passages 2A, 2C, 2E, 2G and 2I are aligned in direction Z on one side of the wall 15 while the even passage-orifices 2B, 2D, 2F and 2H are likewise aligned with each other but on the other side of the wall 15.

The plurality of cones 2, nine in the present embodiment, form a pile one on top of the other with a relatively small distance in between in comparison with the height of each individual cone 2. This distance between cones is fixed by a spacer neck formed on the apex 21 of each cone 2, in the form of an increase in thickness. This neck also has a narrow stud 23 projecting from its upper side and a complementary, blind hole 25 on the opposite side, so that the stud 23 of a cone 2 (i.e. 2B–2l) fits into the hole 25 of the next cone 2 (i. e. 2A–2H), thereby enabling the cones to be easily linked and piled up on one another and properly and evenly spaced in fixed fashion.

The stud 23 and the hole 26 need not be cylindrical. In fact, some sort of assymetry is desirable in order that the cones 2 fit into each other in only one position, that corresponding to the orifices 17 in consecutive cones 2 being in diametrically opposite positions on the wall of the body 1.

A circular grid 27 fits onto the stud 23 of the top cone 2A, thereby enabling the entire arrangement 2 to be centered inside the body 1. This grid forms part of a capsule 27 for housing an accessory filter 31 of porous material, such as polyester foam for example or any other material suitable for retaining relatively big and heavy solid particles. A second grid 33 sits atop the filter 27 to avoid that any deformation of the material 31 caused by the force of the compressed air blocks the outlet 11S in the centre of the cap 3. A number of evenly spaced spokes 36 (e.g. six) formed on the inside face of the cap 3 converge on this centre to maintain a free gap between the top grid 33 and the outlet hole 11S.

The combined effect of the alternating passages 17 and the superposed cones 2 drives the flow of air through an approximately helicoidal path A. Each helix haft-turn Ah further alternates with a vertical component Av in the path A as the air stream passes through the orifice 17 in the deflector 17 and collides against the next deflector surface 19, dropping the liquid components with heavy molecules to be eliminated from continuing through the device. These heavy particles fall back on to the base 29 of the body 1 and eventually down through the pipe connected the inlet 11E, helped on by the funnel shape of this base 29, thereby avoiding that these particles should reach and wear or damage machine parts installed up-stream of the outlet 11S.

The disclosed device is installed as near as possible to the air supply of the installation to be protected and at a higher level, so that the separated liquid can drain naturally down through the piping bringing the air. Maintenance is very simple and easy in case of obstructions, since all the parts are loosely mounted so that a person, skilled or not, using his hand can unscrew the body 1 off the cap 3 and remove the solids filter 27 and the cones 2 for cleaning. The use of materials and parts which remain stable and undeformed throughout use result in that it may usually only be necessary to replace the filter part 31.

Of course, changes, variations and aggregations may be applied to the above-detailed embodiment, without departing from the scope nor the spirit of the invention. The same has been described by way of a preferred embodiment specifically for compressed air installations, however those skilled in the art may suit it to other applications without departing from the purview of the invention as set forth in the appended claims.

We claim:

1. A device for installation in a fluid transportation system for separating components from a fluid transported therethrough from an upstream fluid source to downstream fluid receiving means, said components being relatively heavier than said fluid, said separating device comprising:

housing means having inlet means for coupling to said upstream fluid source and outlet means for coupling to said downstream means so that fluid transported by said system through said housing passes from said inlet means to said outlet means; and means for separating the relatively heavy components from said fluid and comprising:

a plurality of deflector elements housed in said housing, said deflector elements positioned one after the other in spaced relationship in between said inlet and outlet means, wherein each of said plurality of deflector elements opens out towards said inlet means to provide a generally concave deflector surface for said fluid to impinge at an angle thereon, said deflector elements being aligned one after the other in a longitudinal direction extending from said inlet means to said outlet means, said concave surfaces operatively facing said inlet means and forming an oblique angle with the general direction of said fluid impinging therein, the plurality of deflector elements defining a plurality of respective apices aligned in said longitudinal direction and pointing towards said outlet means, said separating means further comprising passage means through each deflector element and offset from the respective apex thereof and from the main direction of said fluid stream impinging thereon, passage means operatively communicating said deflector surface of the associated deflector element towards the deflector surface of the next downstream deflector element and said passages being generally out of line with each other, whereby said fluid, after entering said housing through said inlet means, alternatively and sequentially collides against said deflector surfaces and flows through said passage means.

2. The device of claim 1, wherein said housing includes a cylindrical wall having an inner surface and said passages each comprise an orifice located on the edge of an associated deflector element and against said wall of the housing.

3. The device of claim 2, wherein the orifices in consecutive of said deflector elements are against diametrically opposite sides of said wall.

4. The device of claim 1, wherein each of said plurality of deflector elements comprises a respective cone.

5. The device of claim 4 wherein consecutive ones of said cones are spaced from each other in said longitudinal direction by a distance less than the height of each cone.

6. The device of claim 5 wherein each of said cones includes a respective neck formed at the apex thereof, wherein the spacing between consecutive cones is determined by the longitudinal thickness of said necks.

7. The device of claim 6, wherein each neck includes stud means on one side and a hole on the other, whereby consecutive ones of said deflector cones have the stud means of one fit into the hole of the other to form a pile of cones linked to each other.

8. The device of claim 7 wherein said stud means and holes are asymmetrically shaped so that said stud means fit into respective ones of said holes in selected relative position of said passages.

9. The device of claim 1 further including means for filtering solid particles placed before said outlet means and downstream from said separating means.

10. The device of claim 9, wherein said filter means comprises a disk-shaped capsule means fixed onto the last deflector element of said plurality, said capsule means containing a filter element of a material impermeable to solid particles.

11. The device of claim 1, wherein said deflector elements and said housing with said inlet and outlet means are entirely made of injection molded plastics.

12. The device of claim 1 wherein said housing includes a cylindrical body having an open end and a generally closed end, said closed end having said inlet means formed therein and said housing further including cap means closing on said open end said cap having said outlet means formed therein.

13. The device of claim 12, wherein said cap means includes means for mounting said device, whereby the deflector elements may easily be accessed and removed for maintenance by detaching said body from said cap.

14. A device for separating a liquid phase from compressed air in installations transporting compressed air from a compressor source to pneumatic means, the device comprising:

a hollow cylindrical body having an open end and a generally closed end, said closed end having an inlet hole for coupling to the source side of said installation, a cap closing on said open end of the body, said cap having an outlet for coupling to the pneumatic means side of said installation, means attached to said cap for mounting said cap in a fixed position relative to said installation; and means for separating said liquid phase from said compressed air comprising:

deflector means comprising a pile of conical elements housed in said body and positioned one after the other in a longitudinal direction determined by the generatrix of said cylindrical body, each deflector element including a generally concave deflector surface facing said inlet means and forming an oblique angle with said longitudinal direction, spacer means for separating said conical elements from one another a selected distance in said longitudinal direction, said distance being less than the height of each conical element; and communicating means comprising an orifice located on the edge of each deflector element and against the inner side of said hollow cylindrical body, each orifice operatively communicating said deflector surface of a conical element associated therewith with the deflector surface of the next downstream conical element and said orifices being generally out of line with each other, whereby said compressed air, after entering said housing through said inlet means, alternatively and sequentially collides against said deflector surfaces and flows through said passage means, said fluid colliding against a deflector surface between passing through said passages and viceversa.

15. The device of claim 14, wherein the orifices in consecutive of said deflector elements are against diametrically opposite sides of said wall.

16. The device of claim 14, wherein said spacer means comprise a respective neck formed at the apex of each conical element, wherein said distance is determined by the longitudinal thickness of the necks.

17. The device of claim 16 wherein each neck includes stud means on one side and a complementary hole on the other, whereby consecutive ones of said conical elements have the stud means of one fit into the hole of the other to form a pile of cones linked to each other, and further wherein said stud means and said holes are asymmetrically shaped so that said stud means fit into respective ones of said holes in a selected relative position of said orifices.

18. The device of claim 14, wherein said device for mounting in a substantially vertical position with said inlet at the bottom and said outlet at the top.

19. The device of claim 14, wherein said closed end is funnel-shaped to favour eliminating the separated phases back through said inlet.

20. The device of claim 14 further including means for filtering solid particles comprising a disk-shaped capsule fixed into the last downstream conical element of said plurality, said capsule means containing a filter element of a material impermeable to solid particles.

* * * * *